UNITED STATES PATENT OFFICE.

ALBERT KISSEL, OF FRANKFORT-ON-THE-MAIN, GERMANY, ASSIGNOR TO C. ZIMMER, OF SAME PLACE.

METHOD OF HARDENING OR IMPROVING RESINS OF ALL KINDS.

SPECIFICATION forming part of Letters Patent No. 303,436, dated August 12, 1884.

Application filed June 5, 1884. (No model.)

*To all whom it may concern:*

Be it known that I, ALBERT KISSEL, a citizen of Germany, and residing at Frankfort-on-the-Main, Germany, have invented new and useful Improvements in the Method of Hardening or Improving Resins of all Kinds, of which the following is a specification.

The inventor has observed that natural pine resins and balsams and the products obtained from the same, as also fresh fossil resins of the recent period and those of the *Dipterocarpees* and *Caesalpinees* attain a higher softening-point when the acids contained in these resins are made to combine with lime and other alkaline earths to form salts of the respective alkaline earths, either partially or wholly. This greater degree of hardness stands in direct proportion to the amount of alkaline earthy salts introduced into or formed in the resins, &c.

The conversion of the acids of the resins into salts is carried out as follows: The resin, in a softened, melted, or dissolved state, is mixed with caustic lime, lime hydrate, or carbonate of lime, or with any other alkaline earth or its carbonate. The acid in question is either wholly or partially converted into a salt by the addition of more or less lime, according to the purpose for which it is to be used, or of a mixture of the converted resins and untreated resins, balsams, or products manufactured from resins. By these means one is able to obtain resins or mixtures of resins of any wished-for degree of hardness. Fats, oils, different kinds of tar, pitch, natural or artificial bituminous products can also be brought to a higher softening-point if treated as described in the hardening of resins above. Natural or artificial bituminous products, &c., with balsams, resins, and products from the manufacture of resins, can be hardened by means of the bases and in the manner described above.

Although it is advantageous in most cases to add the lime to the melted, softened, or dissolved resin, &c., still a mixture of powdered resin and powdered lime may be made and handed in this form to the consumer for further treatment.

Although, as already mentioned, other alkaline earths besides lime can be used for the purposes described above—such, for instance, as baryta, strontia, magnesia, or their carbonates—yet lime would have the preference on economical grounds.

Alkalies must not be applied in this process, as they make the mass greasy and form with the resin a soap soluble in water—in fact, do more harm than good in the process of hardening the resin.

I claim—

1. The conversion of the acids contained in balsams, resins, and their products and compounds, or by-products, or in mixtures of resins with other substances, by means of lime or other alkaline earths into their respective salts, in order to harden such resins, resinous by-products, or resin preparations.

2. A mixture of dry resins, balsams, &c., with lime or other alkaline earths, substantially as herein described, and for the purpose set forth.

In testimony whereof I have signed my name to this specification in the presence of two subscribing witnesses.

ALBERT KISSEL.

Witnesses:
 FRANZ WIRTH,
 FRANZ HASSLACHER.